June 5, 1928.

C. F. WASSERFALLEN 1,672,356

TIRE CARRIER

Filed Nov. 19, 1923

2 Sheets-Sheet 1

Inventor
Charles F. Wasserfallen
by Fred Gerlach
his Atty.

June 5, 1928. 1,672,356
C. F. WASSERFALLEN
TIRE CARRIER
Filed Nov. 19, 1923 2 Sheets-Sheet 2
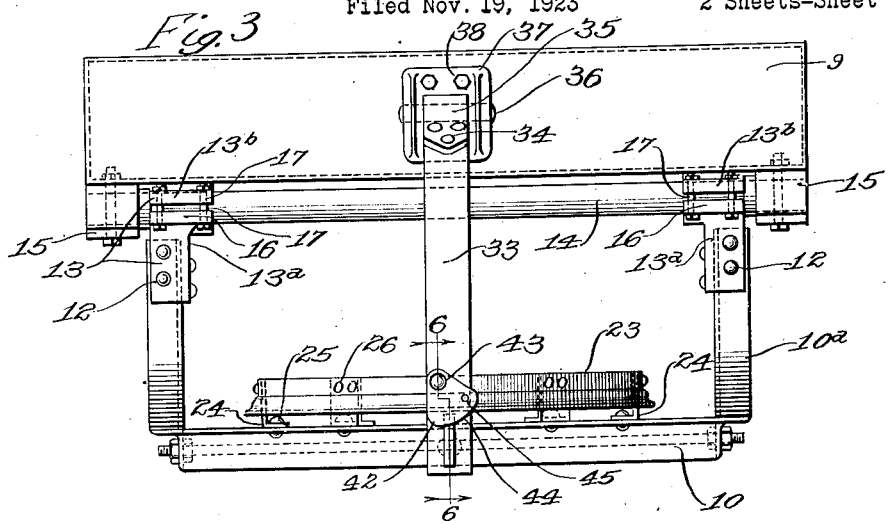
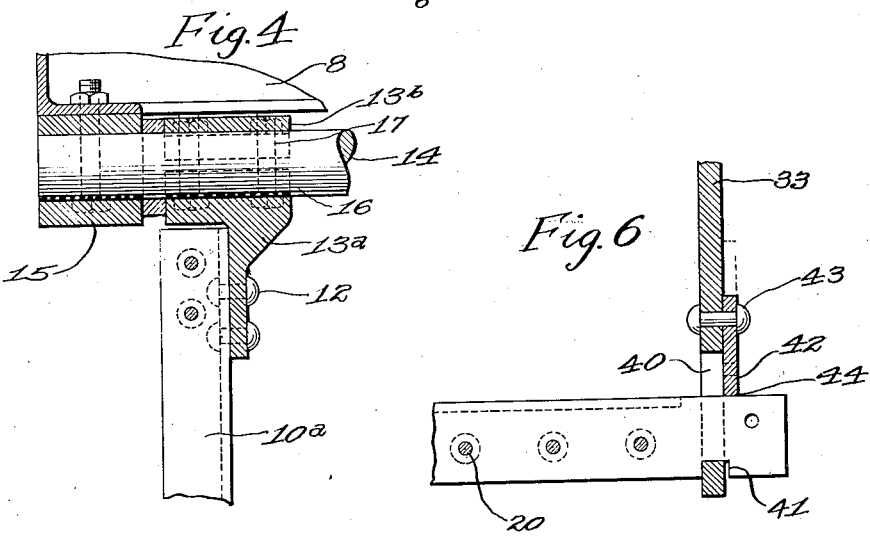
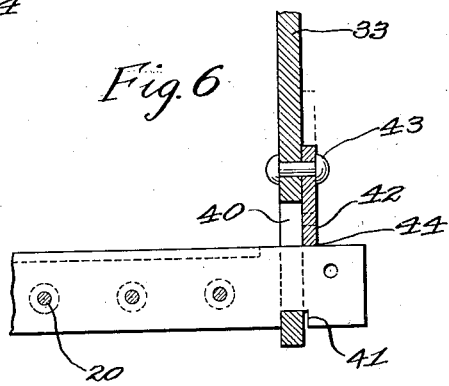
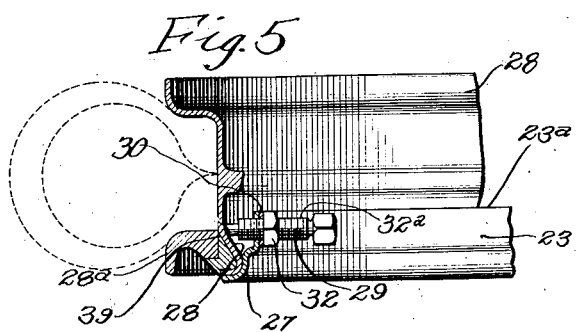
Inventor
Charles F. Wasserfallen
by Fred Gerlach
his Atty.

Patented June 5, 1928.

1,672,356

UNITED STATES PATENT OFFICE.

CHARLES F. WASSERFALLEN, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

TIRE CARRIER.

Application filed November 19, 1923. Serial No. 675,473.

The invention relates to carriers for spare tires and more particularly to carriers adapted for use on trucks, busses or vehicles equipped with heavy rims and tires.

In trucks and busses, which are usually equipped with heavy rims and tires, there is considerable overhang of the body in the rear of the rear axle, and one object of the invention is to provide an improved spare tire carrier in which the space underneath the rear end of the chassis is utilized to carry the spare tire, and in which provision is made for ready access to the tire when the removal and placement of a rim on the carrier becomes necessary. Another object of the invention is to provide a spare tire carrier of improved construction.

The invention consists in the several novel features hereinafter set forth and more particularly defined by the claims at the conclusion hereof.

Figure 1:
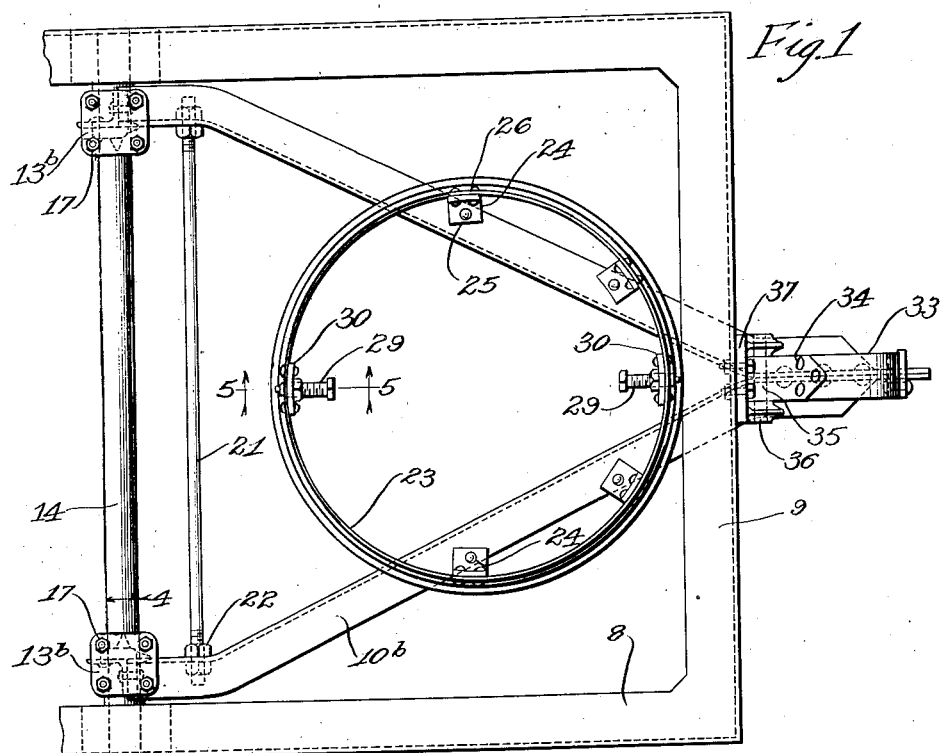
Figure 2:
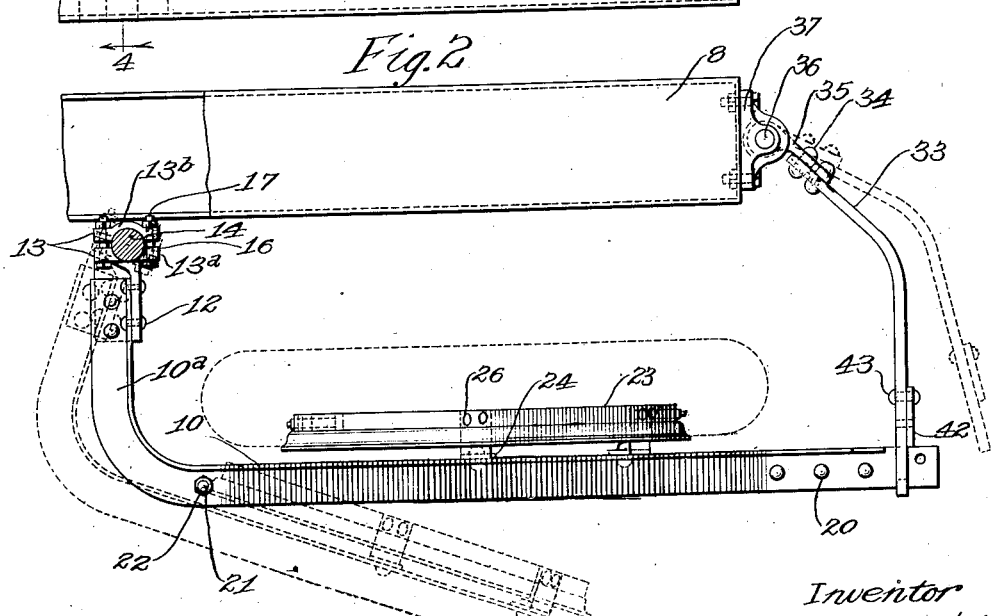

In the drawings: Fig. 1 is a plan of a carrier embodying the invention. Fig. 2 is a side elevation, parts being shown in section. Fig. 3 is a rear elevation. Fig. 4 is a detail section, showing the manner of pivotally mounting the tire carrier frame on the chassis. Fig. 5 is a detail, showing the form of the supporting ring on the carrier frame with a demountable rim thereon. Fig. 6 is a detail of the supporting and locking device for the rear end of the carrier frame.

The invention is illustrated as applied to a rear end of a chassis frame which comprises side-members 8 and a back member 9 which are rigidly secured together and upon which the vehicle body (not shown) is mounted in any suitable manner, as well understood in the art.

The invention is exemplified in a carrier which comprises an undershung frame which is pivotally supported at its front end so that its rear end may be lowered when access to the rim and tire, which are retained under the chassis frame, is desired.

The carrier comprises a frame composed of angle iron bars 10 having vertical members $10^a$, to the upper end of which are secured, by rivets 12, clamp-brackets 13, which are secured to a cross shaft or rod 14 which is pivotally mounted in bearings 15, which are secured to the underside of the chassis frame-sides 8. Each bracket 13 comprises a member $13^a$ provided with a depending angular lug 16, to which member $10^a$ is riveted, and a clamp-member $13^b$. Bolts 17 clamp the members $13^a$ and $13^b$ to the cross shaft 14. The clamps 13 are disposed inwardly of the bearings 15, so that the shaft 14 will be held against endwise movement in said bearings. The bars 10 also comprise members $10^b$ integral with members $10^a$ which extend horizontally and rearwardly and are rearwardly convergent and have the vertical flanges of their rear ends in abutting relation and secured together by rivets 20. Adjacent the front ends, the members $10^b$ are rigidly cross-connected by a rod 21 which extends through the vertical flanges of the bars 10 and is secured thereto by nuts 22. A ring 23 is fixedly secured on the carrier frame by angular lugs 24 which are riveted at 25 to the horizontal flanges of bars 10 and by rivets 26 to the flange $23^a$ of ring 23. This ring is provided with a flared lower flange 27, which is adapted to receive and retain a demountable rim 28 of usual cross section, the flared flange forming a wedge-like seat for the rim on which it will be seated, so that it will not rattle or squeak. Plates 30 are secured by rivets 31 to the inner periphery of flange $23^a$ of the ring and bolts 29 are threaded through said plates respectively and are provided with points 39 at their inner ends for engaging the inner periphery of the demountable rim 28. Lock nuts 32 are provided for screw-threads 32. These bolts are located at diametrically opposite points and are applied to the inner periphery of the demountable rim at points above the inward flare $28^a$ of the rim, so that the pins 39 will effectively secure the rim against upward movement relatively to the ring. The frame, with the ring thereon, exemplifies a support for a demountable rim, which is pivotally sustained under the chassis-frame and is pivoted at its front end, so that the rear end may be raised and lowered to provide ready access to the ring 23 for removal and replacement of a rim and tire.

The rear end of the pivoted carrier frame is supported by a suspension bar 33 which has its upper end riveted at 34 to a lug 35 which is pivotally supported by a pin 36 in a bearing bracket 37 which is secured, as at 38, to the back face of the rear chassis member 9. Adjacent its lower end, the suspension bar 33 is provided with a slot 40 through which the rear terminals of the frame bars 10ᵇ are adapted to extend, so that the carrier frame will be supported by said bar. The horizontal flanges of the bars 10ᵇ are cut away in front of the suspension bar 33. A notch 41 is formed in the lower edge of bars 10ᵇ to interlock with the lower end of suspension bar 33 so that the latter will be locked against pivotal movement by the carrier-frame when it is held in notch 41. A latch-plate 42 is pivoted, at 43, to suspension bar 33 and is provided with an edge 44 which is adapted to rest on the upper face of bars 10ᵇ to lock the carrier frame so that it cannot be lifted to release the suspension bar 33. Registering holes 45 are formed in the latch-plate 42 and suspension bar 33, so that a pad lock may be passed through the holes to lock the latch-plate so it will prevent the suspension bar from being unlocked.

When it is desired to place a demountable rim and tire on the carrier, the carrier frame will be lowered as indicated by dotted lines in Fig. 2, at which time there will be sufficient clearance between the ring 23 and the underside of the chassis frame to permit this to be conveniently done from the rear. While the carrier frame is in such lowered position, the rim will be placed onto the ring 23 and the screws 29 will be tightened to secure the demountable rim on the flared flange 27 of ring 23. When thus secured, the demountable rim will be effectively held on the frame against rattles and squeaks. The rear portion of the carrier frame with the rim and tire thereon will then be lifted approximately into position shown by full lines in Fig. 3, the suspension bar 33 being held rearwardly to permit the carrier frame to be raised into position, so that its rear end will enter slot 40 in the suspension bar when the latter is swung forwardly. When the notch 41 in the carrier frame interlocks with the suspension bar, the carrier frame will be supported horizontally by the suspension bar and the latch-plate 42 will lock the carrier frame against upward movement. In raising and lowering the carrier frame, it will swing around the axis of cross rod 14. When access is again desired to the demountable rim and tire on the carrier frame, it is only necessary to swing the latch 42 upwardly to release the carrier frame, so it can be lifted slightly to unlock the suspension bar, and then swing the latter rearwardly to release the carrier frame so it may be lowered into the dotted line position shown in Fig. 2.

The invention exemplifies a carrier comprising an underslung carrier frame or support by which a demountable rim and tire may be carried horizontally under the rear portion of the chassis frame, and which is movable to provide ready access to the frame, so that a rim can be easily removed from and placed on the carrier. Also a carrier in which a pivoted frame is provided with a rim-carrying ring and a suspension link is utilized to support the carrier frame.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a chassis-frame, of a carrier-frame extending under the chassis-frame comprising a pair of bars, a pivotal connection between the front end of the carrier frame and the chassis-frame, said bars being rearwardly convergent, releasable suspension-means for the rear end of the carrier-frame, and means whereby a demountable rim may be secured on the carrier-frame.

2. The combination with a chassis-frame, of a carrier-frame extending under the chassis-frame comprising a pair of bars, a pivotal connection between the front end of the carrier frame and the chassis frame, a ring secured on the carrier-frame, releasable suspension means for the rear end of the frame, and means whereby a demountable rim may be secured on said ring.

3. The combination with a chassis-frame, of a carrier frame extending under the chassis-frame comprising a pair of rearwardly convergent bars, a pivotal connection between the front end of the carrier frame and the chassis-frame, a ring secured on said bars, releasable suspension means for the rear end of the frame, and means whereby a demountable rim may be secured on said ring.

4. The combination with a chassis-frame, of an underslung carrier-frame comprising bars having upwardly extending members at the front thereof, a pivotal connection between the front of the carrier-frame and the chassis-frame, said bars having their rear ends contiguous and secured together, means whereby a rim may be secured on said frame, and suspension-means at the rear of said bars for supporting the carrier-frame in raised position, releasable to permit the carrier-frame to be lowered.

5. The combination with a chassis-frame, of an underslung carrier frame comprising bars having upwardly extending members at the front thereof, a pivotal connection between the front of the carrier-frame and the chassis-frame, said bars being rearwardly convergent and having their rear ends contiguous and secured together, means whereby a rim may be secured on said frame, and suspension-means at the rear of said bars for supporting the carrier frame in raised position, releasable to permit the carrier-frame to be lowered.

6. The combination with a chassis-frame, of an underslung carrier frame comprising bars having upwardly extending members at the front thereof, a pivotal connection between the front of the carrier frame and the chassis-frame, said bars having their rear ends contiguous and secured together, a ring secured on said bars, means whereby a rim may be secured on said ring, and suspension means at the rear of said bars for supporting the carrier-frame in raised position and releasable to permit the carrier-frame to be lowered.

7. The combination with a chassis-frame, of a carrier comprising a frame extending under the chassis-frame and composed of bars, a pivotal connection between the front end of the carrier-frame and the chassis-frame which permits the rear of the carrier-frame to be raised and lowered, means to secure a rim on the carrier-frame, and a suspension link releasably connected to the rear end of the carrier-frame, supported by the chassis-frame and movable to release the carrier-frame.

8. The combination with a chassis-frame, of a carrier comprising a frame extending under the chassis-frame and composed of bars, a pivotal connection between the front end of the carrier-frame and the chassis-frame which permits the rear of the carrier frame to be raised and lowered, means to secure a rim on the carrier-frame, and a suspension link releasably connected to the rear end of the carrier-frame pivoted at its upper end so it can be swung to release the carrier-frame.

9. The combination with a chassis-frame, of a carrier comprising a frame composed of bars, a pivotal connection between the front end of the carrier-frame and the the chassis-frame which permits the rear of the carrier-frame to be raised and lowered, a ring fixed on said bars to hold a rim, and a suspension link releasably connected to the rear end of the carrier frame and supported by the chassis-frame.

10. The combination with a chassis-frame, of a carrier comprising a frame composed of bars, a pivotal connection between the front end of the bars and the chassis frame which permits the carrier frame to be raised and lowered, means to secure a rim on the carrier-frame, and a suspension link releasably connected to the rear end of the carrier frame, supported by the chassis-frame.

11. The combination with a chassis-frame, of a carrier comprising a frame composed of bars, a pivotal connection between the front end of the bars and the chassis frame which permits the carrier frame to be raised and lowered, means to secure a rim on the carrier-frame, and a suspension-link provided with means to lock the frame in its operative position.

12. The combination with a chassis-frame, of a carrier comprising a frame composed of bars, a pivotal connection between the front end of the carrier frame and the chassis-frame which permits the carrier frame to be raised and lowered, means to secure a rim on the carrier-frame, a suspension link releasably connected to the rear end of the carrier-frame, supported by the chassis frame and provided with means to interlock with the bars, and a latch to lock the bars vertically in the link.

13. The combination with a vehicle chassis-frame, of a carrier-frame disposed beneath the chassis-frame and adapted to extend normally in a horizontal position, said carrier-frame being movably connected to the chassis-frame to permit it to be lowered from and raised into its horizontal position, means rigidly connected to the carrier-frame and disposed at the top thereof for fixedly and removably securing a demountable rim, said rim being adapted to be removed laterally from the means when the carrier-frame is lowered, and releasable means for securing the carrier-frame in its horizontal position.

14. The combination with a vehicle chassis-frame, of a carrier-frame disposed beneath the chassis-frame and adapted to extend normally in a horizontal position, a pivotal connection between the front end of the carrier-frame and the chassis-frame to permit the carrier-frame to be swung down from and up into its horizontal position, means rigidly connected to the carrier-frame and disposed at the top thereof for fixedly and removably securing a demountable rim, said rim being adapted to be removed laterally from the means when the carrier-frame is lowered, and releasable means for securing the carrier-frame in its horizontal position.

15. The combination with a vehicle chassis-frame, of a carrier-frame disposed beneath the chassis-frame and adapted to extend normally in a horizontal position, said carrier-frame being movably connected to the chassis-frame to permit it to be lowered from and raised into its horizontal position, a ring rigidly connected to the carrier-frame and disposed at the top thereof for fixedly and removably securing a demountable rim, said rim being adapted to be removed laterally from the ring when the carrier-frame is lowered, and releasable means for securing the carrier-frame in its horizontal position.

Signed at Detroit, Michigan, this 13th day of November, 1923.

CHARLES F. WASSERFALLEN.